United States Patent
Skopek et al.

(10) Patent No.: US 11,268,496 B2
(45) Date of Patent: Mar. 8, 2022

(54) DISTRIBUTED WIND PARK CONTROL

(71) Applicant: Inventus Holdings, LLC, Juno Beach, FL (US)

(72) Inventors: Jason R. Skopek, Stuart, FL (US); Hector K. Lopez, Jupiter, FL (US)

(73) Assignee: Inventus Holdings, LLC, Juno Beach, FL (US)

( * ) Notice: Subject to any disclaimer, the term of this patent is extended or adjusted under 35 U.S.C. 154(b) by 111 days.

(21) Appl. No.: 16/537,138

(22) Filed: Aug. 9, 2019

(65) Prior Publication Data
US 2021/0040935 A1 Feb. 11, 2021

(51) Int. Cl.
F03D 7/04 (2006.01)
F03D 7/02 (2006.01)
H02J 3/38 (2006.01)

(52) U.S. Cl.
CPC ........... F03D 7/048 (2013.01); F03D 7/0284 (2013.01); H02J 3/386 (2013.01); F05B 2270/1071 (2013.01); F05B 2270/20 (2013.01)

(58) Field of Classification Search
None
See application file for complete search history.

(56) References Cited

U.S. PATENT DOCUMENTS

| 5,422,826 A | 6/1995 | Cousineau |
| 7,808,126 B2 | 10/2010 | Stiesdal |
| 8,912,675 B2 | 12/2014 | Mata et al. |
| 9,217,418 B2 | 12/2015 | Bodewes et al. |
| 9,306,395 B2 | 4/2016 | Garcia |

(Continued)

FOREIGN PATENT DOCUMENTS

| WO | 2017174085 | 10/2017 |
| WO | 2018115431 | 6/2018 |
| WO | 2018153526 | 8/2018 |

OTHER PUBLICATIONS

Veilleux, Etienne & Lehn, Peter. (2014). Interconnection of Direct-Drive Wind Turbines Using a Series-Connected DC Grid. Sustainable Energy, IEEE Transactions on. 5. 139-147. 10.1109/TSTE.2013.2276616.

(Continued)

*Primary Examiner* — Mohammad Ali
*Assistant Examiner* — Saad M Kabir
(74) *Attorney, Agent, or Firm* — Fleit Intellectual Property Law; Donna Flores

(57) ABSTRACT

Various embodiments distributively control a wind park having a plurality of wind turbines. Each wind turbine controlled by its own turbine controller. Each turbine controller determines power production capability of its dedicated wind turbine. The power production capability of the single wind turbine is communicated with a plurality of other turbine controllers in the wind park. A consensus power distribution schedule to distribute power to a power grid is determined using votes from each turbine controller in the wind park. Energy is discharged from each wind turbine to a power grid according to the power distribution schedule. When one wind turbine fails, a new power distribution schedule is determined using votes from each remaining turbine controller and energy is discharged from each wind turbine to the power grid according to the new power distribution schedule.

20 Claims, 6 Drawing Sheets

(56) References Cited

U.S. PATENT DOCUMENTS

| | | | |
|---|---|---|---|
| 9,541,063 B2 | 1/2017 | Yin | |
| 9,631,608 B2 | 4/2017 | Garcia | |
| 9,698,715 B2 | 7/2017 | Bodewes | |
| 9,863,401 B2 | 1/2018 | Sahukari et al. | |
| 9,882,390 B2 | 1/2018 | Avrutsky et al. | |
| 9,920,745 B2 | 3/2018 | Fotmann | |
| 9,989,034 B2 | 6/2018 | Andresen et al. | |
| 10,063,055 B2 | 8/2018 | Matan et al. | |
| 10,132,295 B2 | 11/2018 | Lund et al. | |
| 2002/0084655 A1 | 7/2002 | Lof et al. | |
| 2004/0024494 A1* | 2/2004 | Bayoumi | H02J 13/00024 700/286 |
| 2013/0173073 A1 | 7/2013 | Breeze et al. | |
| 2014/0049046 A1* | 2/2014 | Bengtson | G05B 9/03 290/44 |
| 2014/0229153 A1 | 8/2014 | Grastein | |
| 2017/0234299 A1 | 8/2017 | Kjaer et al. | |
| 2017/0292498 A1 | 10/2017 | Garcia et al. | |
| 2017/0356421 A1 | 12/2017 | Petitjean et al. | |

OTHER PUBLICATIONS

J. Morren and S. W. H. de Haan, "Ridethrough of wind turbines with doubly-fed induction generator during a voltage dip," in IEEE Transactions on Energy Conversion, vol. 20, No. 2, pp. 435-441, Jun. 2005.

* cited by examiner

DISTRIBUTED WIND PARK CONTROL

BACKGROUND

Field of the Invention

The present disclosure generally relates to wind turbine controllers, and more particularly relates to a distributed mesh style wind park control system.

Description of the Related Art

Currently, power producing wind parks rely upon a single controller to take measurements and send power, power angle and reactive power commands to the turbines. One controller has exclusive control over the entire park. However, when this single controller fails, all the wind turbines in the park will fail to follow a demand signal. Unfortunately, this failure currently happens several times a year, increasing the risk of failing to comply to voltage schedules and power output schedules.

FIG. 1 shows a block diagram of a prior art electricity-producing wind park system 100. A plurality of wind turbines 102a, 102b, 102c (referenced collectively and generally herein as wind turbine 102) are controlled by a single park-wide power/voltage controller 104. Using requirements set by power & voltage demand signal 106, power/voltage controller 104 monitors the amount of power generated by the wind turbines 102 using power meter 108 and determines the amount of power produced by each wind turbine 102 that should be distributed to the power grid (not shown).

BRIEF SUMMARY

In one embodiment, a method of distributively controlling a wind park is disclosed. The wind park includes a plurality of wind turbines, where each wind turbine is controlled by its own turbine controller. The method comprises determining, by a turbine controller dedicated to a single wind turbine, power production capability of the single wind turbine; communicating the power production capability of the single wind turbine with a plurality of other turbine controllers in the wind park; determining a consensus power distribution schedule to distribute power to a power grid using votes from each turbine controller in the wind park; and discharging energy from the wind turbine to a power grid according to the power distribution schedule.

In another embodiment, an electricity-producing wind park is disclosed. The wind park comprises a plurality of turbine controllers and a plurality of wind turbines. Each wind turbine is controlled by its own dedicated turbine controller. Each turbine controller determines power production capability of its corresponding wind turbine, communicates the power production capability of its corresponding wind turbine with the plurality of other turbine controllers, determines a consensus power distribution schedule to distribute power to a power grid using votes from each turbine controller in the wind park, discharges energy from the wind turbine to a power grid according to the consensus power distribution schedule.

In yet another embodiment, a computer program product for distributively controlling a wind park is disclosed. The computer program product comprises a non-transitory storage medium readable by a processing circuit and storing instructions for execution by the processing circuit for performing a method. The method comprises determining, by a turbine controller dedicated to a single wind turbine, power production capability of the single wind turbine; communicating the power production capability of the single wind turbine with a plurality of other turbine controllers in the wind park; determining a consensus power distribution schedule to distribute power to a power grid using votes from each turbine controller in the wind park; and discharging energy from the wind turbine to a power grid according to the power distribution schedule.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
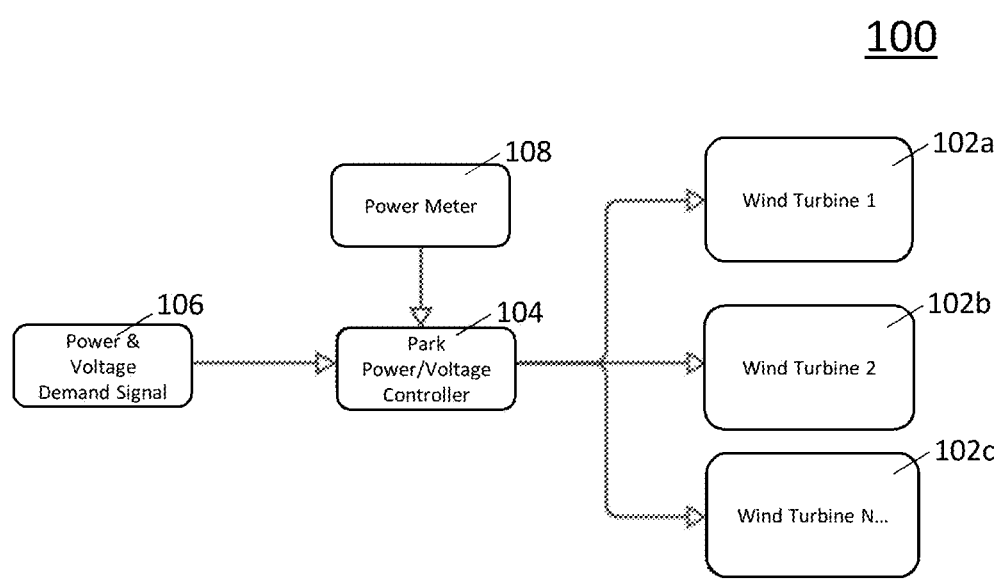
FIG. 1 is a block diagram illustrating an electricity-producing wind park system according to prior art.
Figure 2:
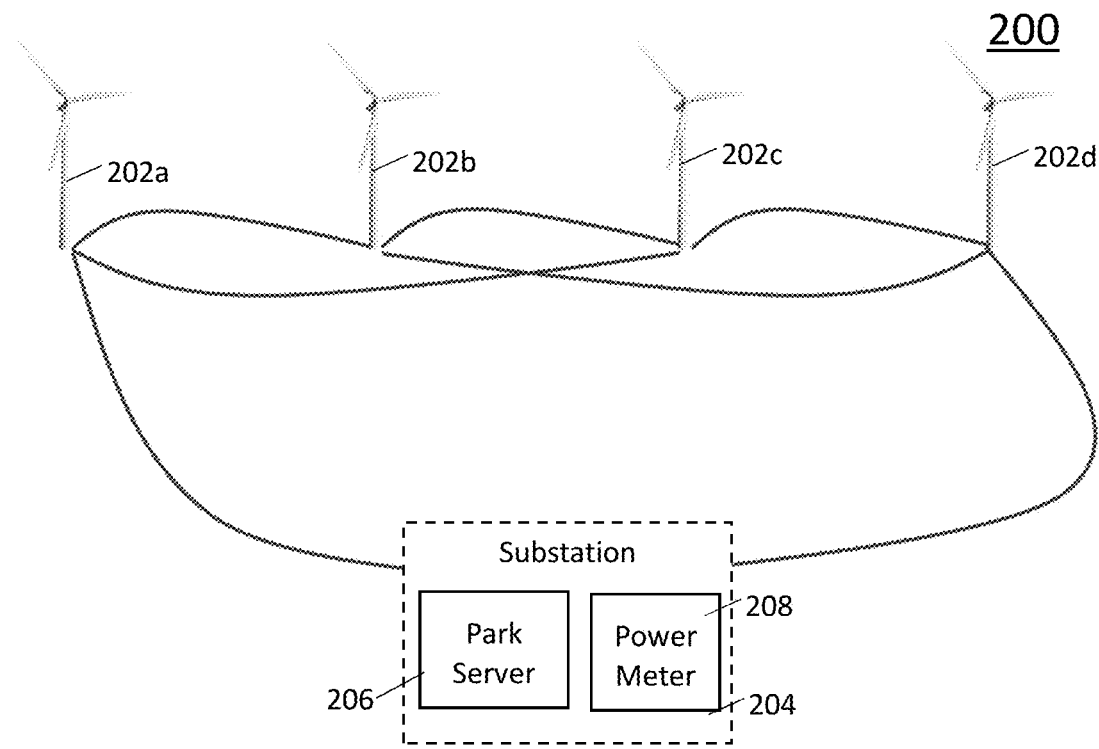
FIG. 2 is a graphical representation of an example embodiment of an electricity-producing wind park system, in accordance with the present invention.
Figure 3:
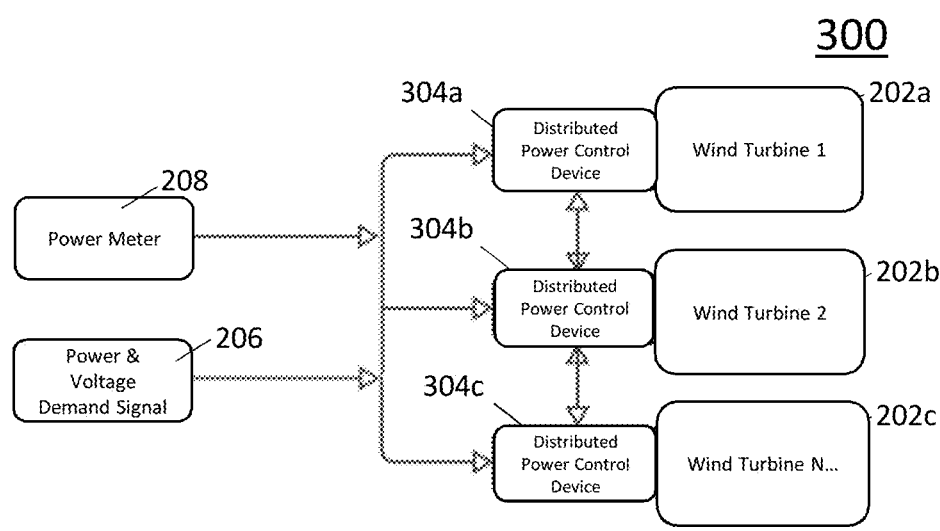
FIG. 3 is a block diagram illustrating the example embodiment of an electricity-producing wind park system of FIG. 2, in accordance with the present invention.

FIGS. 2 and 3 depict an electricity-producing wind park system 200, in accordance with one embodiment of the present invention. A plurality of wind turbines 202a, 202b, 202c, 202d (referenced collectively or generally herein as "wind turbine 202") convert wind power into electricity. It should be noted that the number of wind turbines 202 presented is arbitrary and for illustrative purposes only. Any number of wind turbines 202 may be present. Control of the wind park system 100 is distributed among turbine control devices 304a, 304b, 304c (referenced collectively or generally herein as "turbine control device 304"). Each turbine control device 304 controls one wind turbine 202 and is in communication with a park-wide substation 204 which includes a power meter 208 and a park server 206. All the turbine control devices 304 are also in communication with each other and control functionality of the wind park system 100 in a distributed mesh manner. Production scheduling of the entire wind park system 100 is based off current individual turbine conditions. The wind park system 100 is assigned a set point which defines the amount of power the entire system 100 should generate. This power requirement is divided amongst the plurality of wind turbines 202 by the turbine control devices 304. Each turbine control device 304 calculates a schedule from the perspective of its associated wind turbine 202. The turbine control devices 304 "vote" on which schedule will be implemented. The votes are weighted on the controlled turbine's current active and reactive power production. In this way, if one turbine 202 fails (e.g., enters a warning or error state, is unresponsive, is placed off-line for maintenance, inspection, safety, environmental concerns, etc.), the turbine controllers 304 for the remaining wind turbines 202 recalculate the power distribution schedule without the failed turbine and continue operation of the wind park system 100.

The power meter 208 measures the amount of power being distributed to the power grid (not shown). Each turbine controller 304 has access to read from the power meter 208 for point of interconnect measurement data, (e.g., real power, reactive power, voltages, currents, frequency, etc.). The park server 206, also referred to as a Supervisory Control and Data Acquisition (SCADA) server, operates from the substation 204 and contains a user interface to define the requirements and constraints of the system 100 for items such as reliability regulation, commercial contracts and equipment/design envelopes. The park server 206 is used to interface with HMI screens and store data from the wind park 200.

In addition, the park server 206 informs the turbine control devices 304 as to how much power is needed for the power grid by sending a "Demand Signal" to each turbine control device 304. This demand signal sets constraints for the distributed system consensus, in order to comply with contractual power limits and voltages schedules. The demand signal originates from an offtaker or transmission operator, who is providing guidance on how much real power or reactive power is needed from the park. The demand signals are sampled at predetermined intervals and stored in the turbine controller's 304 memory. These demand signals serve as limits to the consensus signals.

Figure 4:
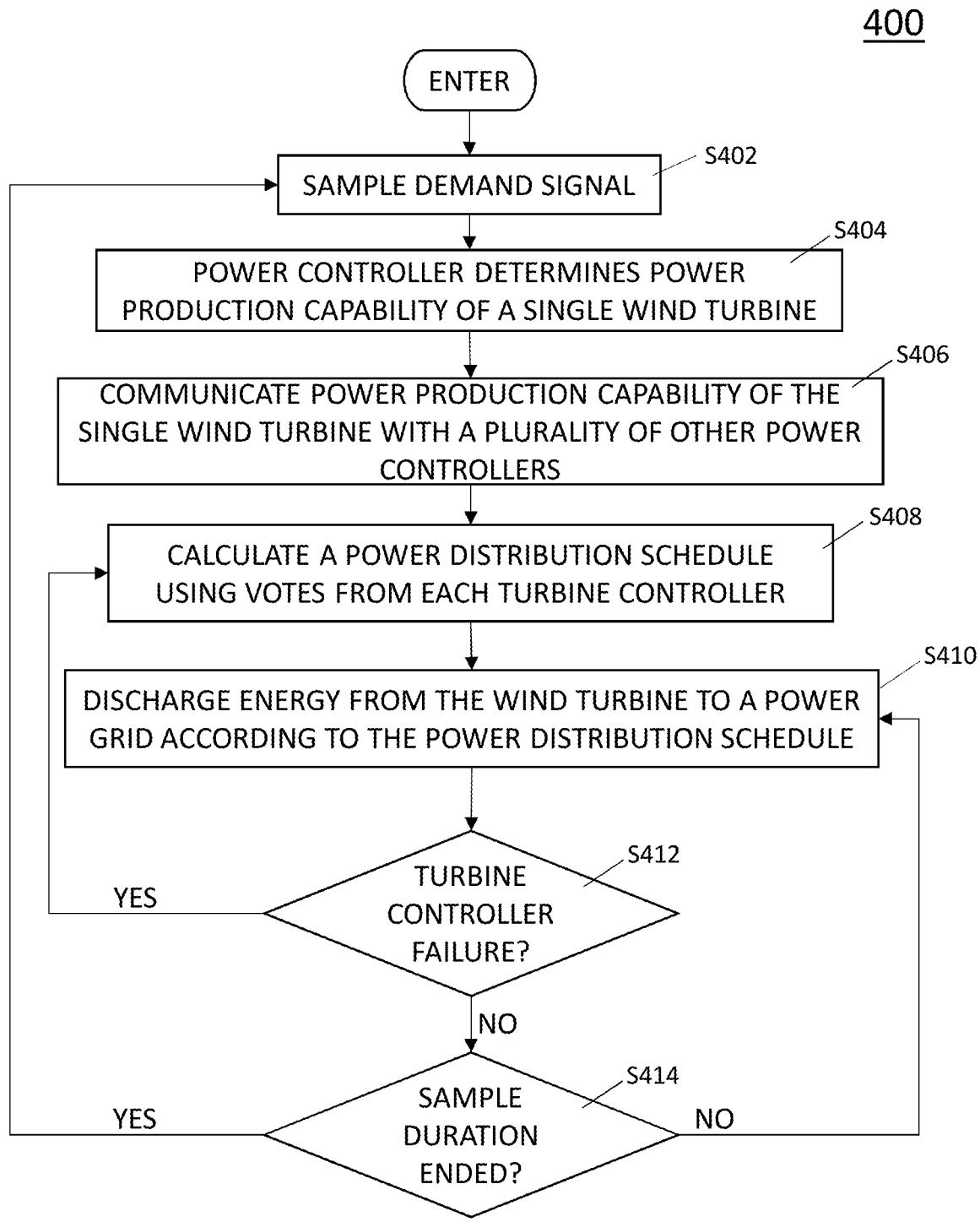
FIG. 4 is an operational flowchart illustrating operation of the example electricity-producing wind park system of FIGS. 2 and 3 according to the principles of the present invention.

FIG. 4 presents an operational flowchart 400 of an example method of operating an electricity-producing wind park system 100 having a distributed mesh-style control according to one embodiment of the present invention. Beginning in step S402, a demand signal from the park server 206 is sampled by each turbine controller 304. At step S404, each turbine controller 304 determines power production capability of its dedicated wind turbine 202. Power generation can vary from turbine to turbine based upon a location in a wind park, wakes from adjacent wind turbines, variations in wind speed and density across the park, and aging components of the wind turbine such as blades, bearings, etc. At step S406, the turbine controller 304 communicates the power production capability of its dedicated wind turbine 202 with all other turbine controllers 304 in the wind park system 100. At step S408, a power distribution schedule to distribute power to a power grid is calculated using votes from each turbine controller 304 in the wind park 100. Each vote is weighted by the turbine controller's 304 dedicated wind turbine's current active and reactive power. In one embodiment, the power distribution calculation is performed using a consensus algorithm, which will be discussed in detail below.

At step S410, electrical power converted by the wind turbine 202 is dispersed to a power grid according to the power distribution schedule. If one turbine 202 or turbine controller 304 fails, at step S412, a new power distribution schedule is recalculated using votes from each remaining turbine controller, at step S408 and energy from the remaining wind turbines is dispersed to the power grid according to the new power distribution schedule.

The demand signal is periodically sampled, thus, when the sample duration ends, at step S414, the process returns to step S402 and the process is performed again to update the distribution schedule as needed.

FIGS. 5-9 are state diagrams illustrating how the consensus algorithm for voting on the distribution schedule performs. The wind turbines 202 exist in one of 3 states: 1) Follower, 2) Candidate, and 3) Leader. In FIGS. 5-9, the current state of each wind turbine 202 is shown as "1" for follower, "2" for candidate or "3" for leader.

Figure 5:
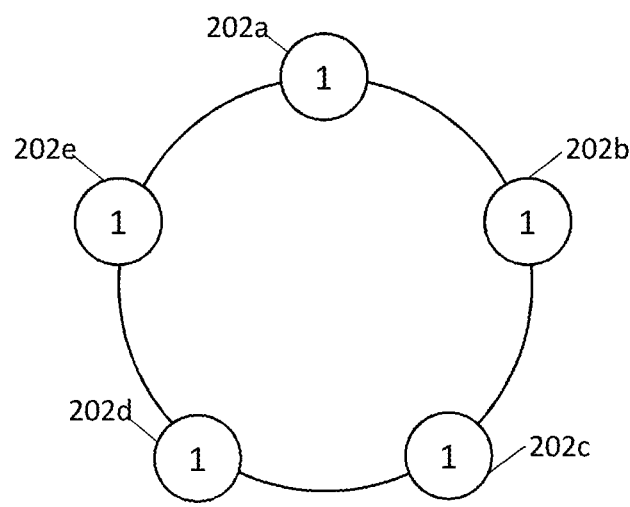
FIG. 5 is a state diagram of a first state of a voting algorithm for use in determining a primary controller for the system of FIGS. 2 and 3 according to the an example of the present invention.

Given the constrains from the demand signal, each turbine controller 304 calculates an individual real power, reactive power set point and turbine operational state for its dedicated wind turbine 202. Each turbine controller 304 waits a random amount of time before sending a signal to the other turbine controllers 304. As shown in FIG. 5, each wind turbine 202 begins the process as a "Follower."

Figure 6:
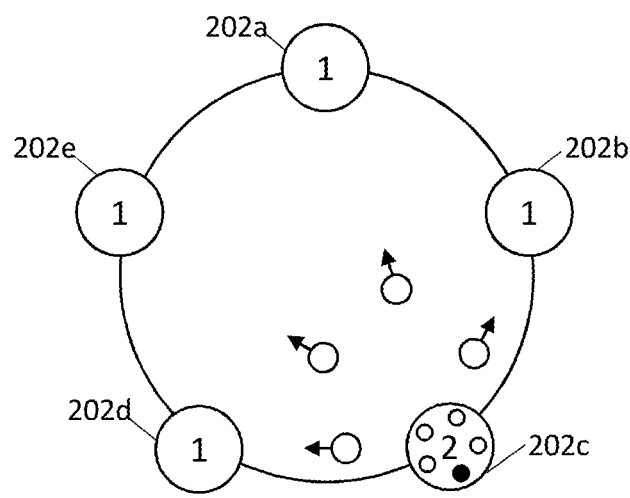
FIG. 6 is a state diagram of a second state of a voting algorithm for use in determining a primary controller for the system of FIGS. 2 and 3 according to the an example of the present invention.

Once one wind turbine timeout is completed, its turbine controller sends the signal to all the remaining turbine controllers, as "Candidate." In FIG. 6, wind turbine 202*c* is has timed out and is now a candidate. It should be noted that the initial timeout period for each wind turbine is typically randomized.

Figure 7:
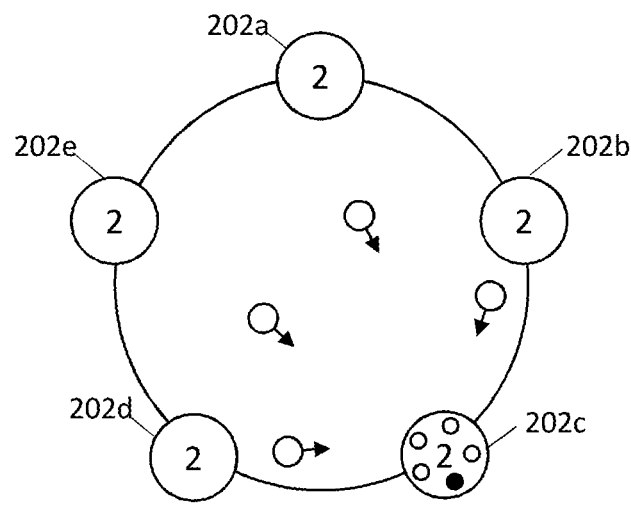
FIG. 7 is a state diagram of a third state of a voting algorithm for use in determining a primary controller for the system of FIGS. 2 and 3 according to the an example of the present invention.

As shown in FIG. 7, each turbine controller that receives a signal while waiting to send a signal then resets the timer and sends back a response to the originating turbine controller (i.e. controller for wind turbine 202*c*). The originating turbine 202*c* is not the leader until it receives feedback from all other wind turbines or an adjustable "consensus" amount of >50% of the turbines.

Figure 8:
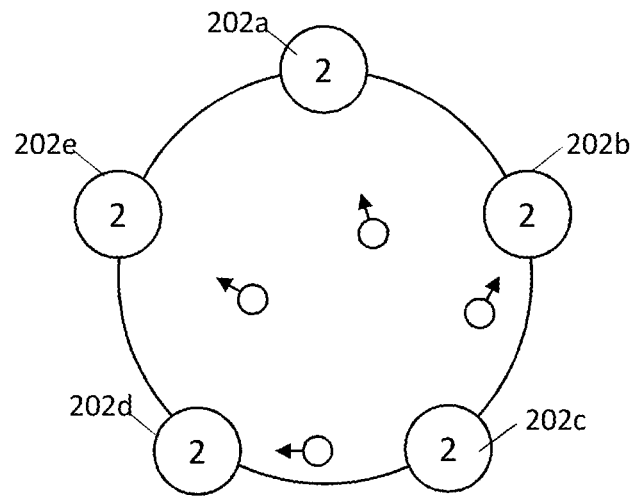
FIG. 8 is a state diagram of a fourth state of a voting algorithm for use in determining a primary controller for the system of FIGS. 2 and 3 according to the an example of the present invention.

Once the node (i.e. wind turbine 202*c*) gets consensus, it is now the leader, as shown in FIG. 8. As the leader, turbine controller 304*c* for wind turbine 202*c* sends its leader status and the calculated set point to all other turbines. During the exchange described above, the leader also collects data status of the turbines participating. The leader will receive the status (i.e. "votes") of each turbine and weigh the votes to ensure that the turbines with warning get priority on reducing real power and remain closer to unity power factor. As long as the leader can calculate the set point and send it in time to the other turbines, it will keep sending the power and reactive power set point to the turbines. It will also, prioritize turbines depending on their turbine operational state. For example, if a turbine has a mechanical system warning, it will reduce a larger proportion of power for that turbine in warning than the other turbines participating in the consensus.

Figure 9:
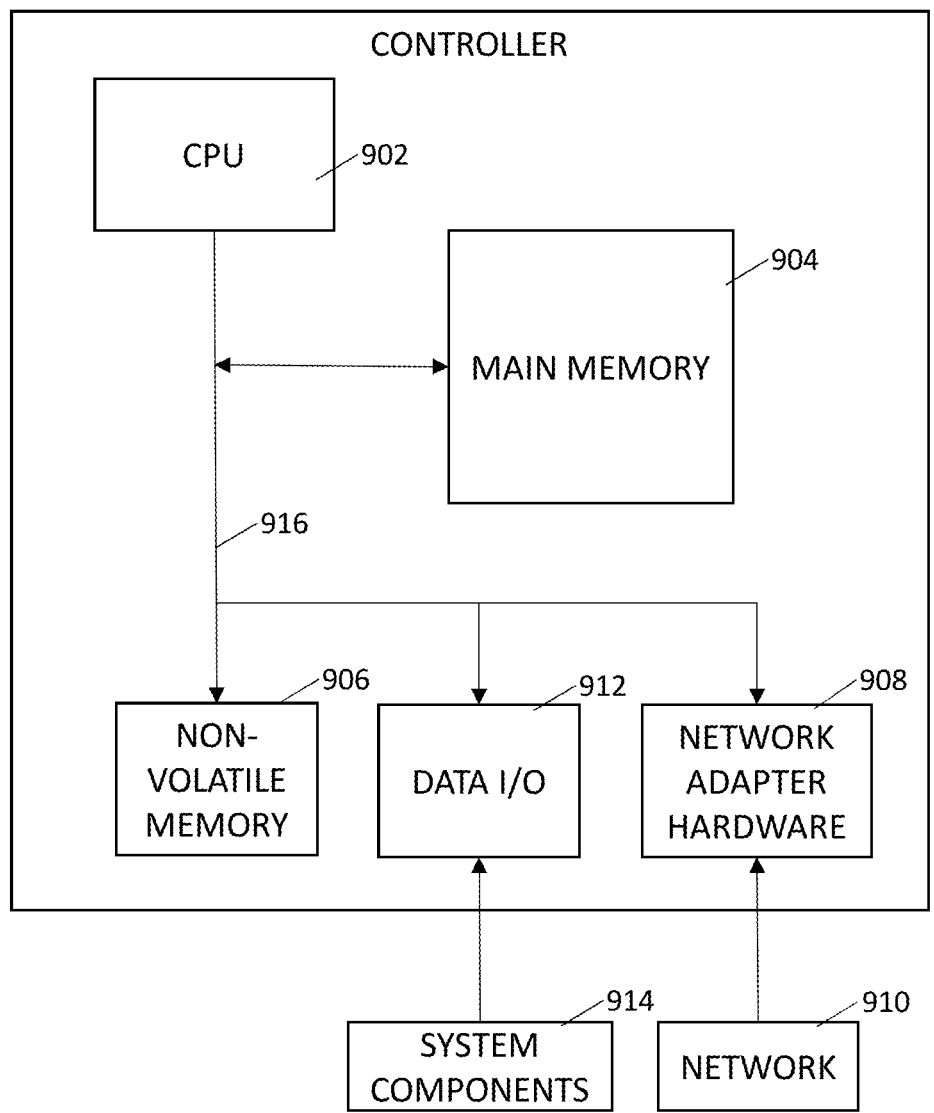
FIG. 9 is a block diagram of an example controller for use with the example electricity-producing wind park system of FIGS. 2 and 3, according to one embodiment of the present disclosure.

Turning now to FIG. 9, a block diagram illustrating a distributed power turbine controller, such as controller 304 from FIG. 3, is provided in accordance with one example of the present disclosure. The controller 304 is an example of a processing subsystem that is able to perform any of the above described processing operations, control operations, other operations, or combinations of these.

The controller 304 in this example includes a central processing unit (CPU) 902 that is communicatively connected to a main memory 904 (e.g., volatile memory) and a non-volatile memory 906 to support processing operations. The CPU 902 is further communicatively coupled to a network adapter hardware 908 to support input and output communications with external computing systems such as through the illustrated network 910.

The controller 304 further includes a data input/output (I/O) processor 912 that is able to be adapted to communicate with any type of equipment, such as the illustrated system components 914. The data input/output (I/O) processor 912, in various examples, is able to be configured to support any type of data communications connections including present day analog and/or digital techniques or via a future communications mechanism. A system bus 916 INTERCONNECTS THESE SYSTEM COMPONENTS.

Non-Limiting Embodiments

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer maybe connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of distributively controlling a wind park having a plurality of wind turbines, each wind turbine controlled by its own turbine controller, the method comprising;
    determining, by a turbine controller dedicated to a single wind turbine, current power production capability of the single wind turbine;
    communicating the current power production capability of the single wind turbine directly with a plurality of other turbine controllers in the wind park, each of the turbine controllers operating in one of three states: a leader, a candidate and a follower, wherein only one turbine controller is operating as the leader;
    determining, by the turbine controller operating as the leader, a consensus power distribution schedule to distribute power to a power grid using votes from each turbine controller in the wind park;
    sending, from the turbine controller operating as the leader to each remaining turbine controller of the plurality of turbine controllers, the consensus power distribution schedule; and
    discharging energy from the single wind turbine to a power grid according to the power distribution schedule.

2. The method of claim 1, further comprising:
    when one wind turbine fails:
        determining a new power distribution schedule using votes from each remaining turbine controller; and
        discharging energy from the wind turbine to the power grid according to the new power distribution schedule.

3. The method of claim 2, wherein wind turbine failure comprises being placed off-line, entering a warning state, or entering an error state.

4. The method of claim 2, wherein wind turbine failure comprises the corresponding turbine controller for the wind turbine being unresponsive.

5. The method of claim 1, wherein each vote is weighted by its corresponding wind turbine's current active and reactive power.

6. The method of claim 1, further comprising periodically sampling a demand signal to determine constraints for the consensus power distribution schedule.

7. The method of claim 1, wherein the consensus power distribution schedule comprises power and reactive power set points for each wind turbine in the plurality of wind turbines.

8. An electricity-producing wind park comprising:
    a plurality of turbine controllers;
    a plurality of wind turbines, each wind turbine controlled by its own dedicated turbine controller, each turbine controller:
        determining current power production capability of its corresponding wind turbine;
        communicating the current power production capability of the single wind turbine directly with a plurality of other turbine controllers in the wind park, each of the turbine controllers operating in one of three states: a leader, a candidate and a follower, wherein only one turbine controller is operating as the leader;
        determining, by the turbine controller operating as the leader, a consensus power distribution schedule to distribute power to a power grid using votes from each turbine controller in the wind park;
        sending, from the turbine controller operating as the leader to each remaining turbine controller of the plurality of turbine controllers, the consensus power distribution schedule; and
        discharging energy from the single wind turbine to a power grid according to the power distribution schedule.

9. The electricity-producing wind park of claim 8, wherein when one wind turbine fails, each turbine controller for the remaining wind turbines:
    determines a new power distribution schedule using votes from each remaining turbine controller; and
    discharges energy from the wind turbine to the power grid according to the new power distribution schedule.

10. The electricity-producing wind park of claim 9, wherein wind turbine failure comprises the wind turbine being placed off-line, entering a warning state, or entering an error state.

11. The electricity-producing wind park of claim 9, wherein wind turbine failure comprises the corresponding turbine controller for the wind turbine being unresponsive.

12. The electricity-producing wind park of claim 8, wherein each vote is weighted by its corresponding wind turbine's current active and reactive power.

13. The electricity-producing wind park of claim 8, wherein each turbine controller periodically samples a demand signal to determine constraints for the consensus power distribution schedule.

14. The electricity-producing wind park of claim 8, wherein the consensus power distribution schedule comprises power and reactive power set points for each wind turbine in the plurality of wind turbines.

15. A computer program product for distributively controlling a wind park having a plurality of wind turbines, each wind turbine controlled by its own turbine controller, the computer program product comprising:

a non-transitory storage medium readable by a processing circuit and storing instructions for execution by the processing circuit for performing a method comprising:

determining, by a turbine controller dedicated to a single wind turbine, current power production capability of the single wind turbine;

communicating the current power production capability of the single wind turbine directly with a plurality of other turbine controllers in the wind park, each of the turbine controllers operating in one of three states: a leader, a candidate and a follower, wherein only one turbine controller is operating as the leader;

determining, by the turbine controller operating as the leader, at least one of the turbine controller and the plurality of other turbine controllers, a consensus power distribution schedule to distribute power to a power grid using votes from each turbine controller in the wind park; and sending, from the turbine controller operating as the leader to each remaining turbine controller of the plurality of turbine controllers, the consensus power distribution schedule; and discharging energy from the single wind turbine to a power grid according to the power distribution schedule.

16. The computer program product of claim 15, wherein the method further comprises:

when one wind turbine fails:

determining a new power distribution schedule using votes from each remaining turbine controller; and discharging energy from the wind turbine to the power grid according to the new power distribution schedule.

17. The computer program product of claim 16, wherein wind turbine failure comprises the wind turbine being placed off-line, entering a warning state, or entering an error state.

18. The computer program product of claim 16, wherein wind turbine failure comprises the corresponding turbine controller for the wind turbine being unresponsive.

19. The method of claim 1, wherein the current power production capability of each wind turbine in the plurality of wind turbines is based on its location in the wind park, wakes from adjacent wind turbines, variations in wind speed and density across the park, and age of components of the wind turbine.

20. The electricity-producing wind park of claim 8, wherein the current power production capability of each wind turbine in the plurality of wind turbines is based on its location in the wind park, wakes from adjacent wind turbines, variations in wind speed and density across the park, and age of components of the wind turbine.

* * * * *